H. G. WEBSTER.
TELEPHONE EXCHANGE SYSTEM.
APPLICATION FILED DEC. 4, 1907.
930,521. Patented Aug. 10, 1909.
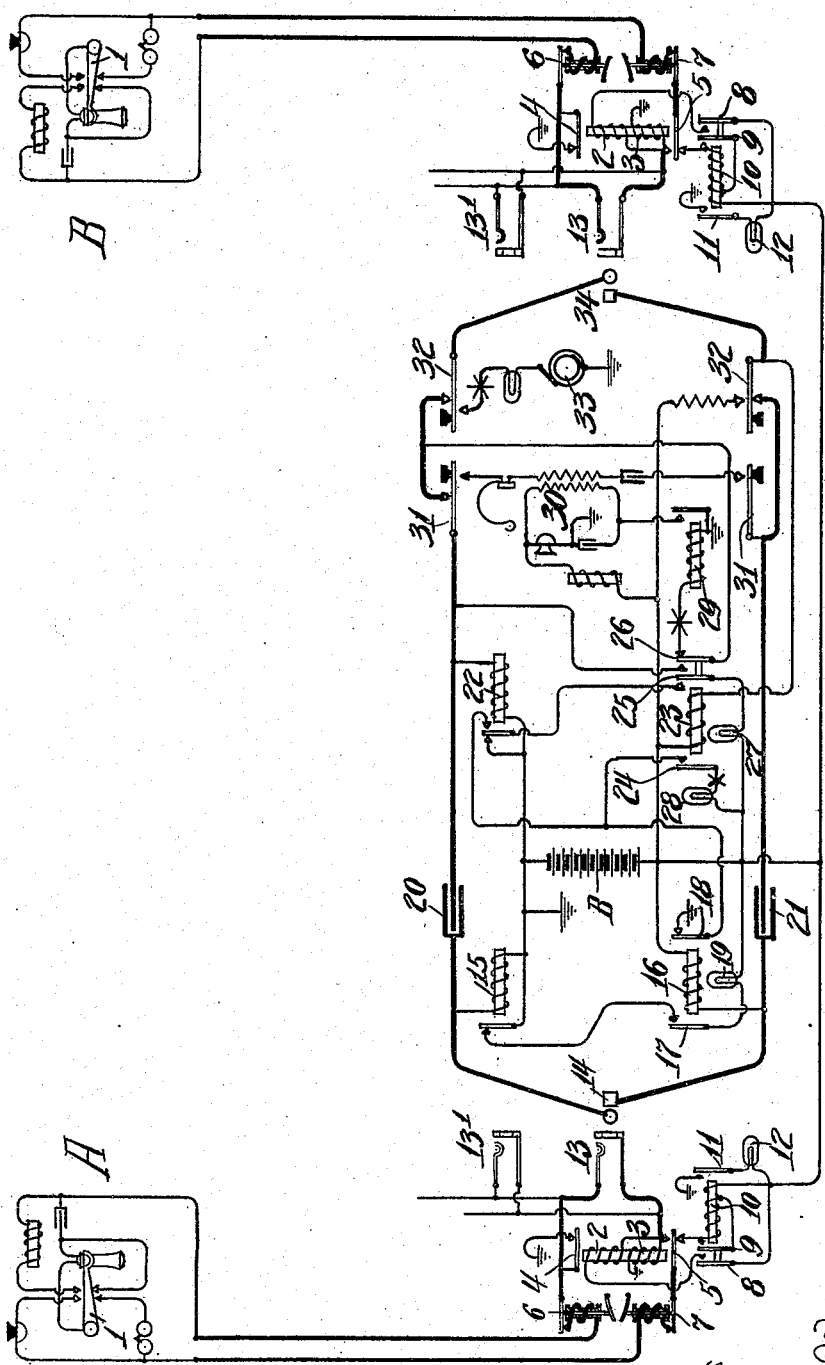
Witnesses
G. E. Mueller
J. G. Kellogg
Inventor
Harry G. Webster
by Leroy D. Kellogg
Atty.

UNITED STATES PATENT OFFICE.

HARRY G. WEBSTER, OF CHICAGO, ILLINOIS, ASSIGNOR TO MILO G. KELLOGG, OF CHICAGO, ILLINOIS.

TELEPHONE-EXCHANGE SYSTEM.

No. 930,521.     Specification of Letters Patent.     Patented Aug. 10, 1909.

Application filed December 4, 1907. Serial No. 405,064.

*To all whom it may concern:*

Be it known that I, HARRY G. WEBSTER, residing at Chicago, in the county of Cook and State of Illinois, have invented new and useful Improvements in Telephone-Exchange Systems, of which the following is a specification.

My invention relates more particularly to testing means employed in connection with such systems, and has for an object the provision of improved means for controlling the circuit of a testing device or relay which is common to the cord circuits of an operator's position.

It is apparent that where an operator depends upon a single testing device common to all the cords, it is highly important that the getting out of order of one cord circuit should not result in rendering the testing device inoperative with respect to the other cords, as in such case the entire position would be practically thrown out of service.

In a general way, it may be stated that the known arrangements of common test relays, which are preferably of high resistance and high impedance, to operators' circuits are of two characters. First, the testing relay is normally connected with the test contacts of all the connecting plugs at the position, its circuit being led by branches through armature switches of the calling supervisory relays of the different cords, so that when the calling plug of a cord is inserted within the jack of a called-for line, the test relay will be cut off from the test contact of that cord circuit. The second arrangement which has been proposed is one wherein the test relay of a position is normally disconnected from the test contacts of all the plugs, being only connected thereto by a contact closed by the operator in actuating her listening key. A difficulty found in practice in employing the first mentioned arrangement, which is in some respects a preferable arrangement, has been found to consist in this: that when, as not infrequently happens, the tip and sleeve conductors of a calling cord become accidentally crossed, the test relay being normally connected to the tip strand and the sleeve supervisory relay being connected to the sleeve strand with the central battery bridge between them, the test relay will be continuously energized, thus keeping closed a circuit through the testing winding of the operator's induction coil. As the test relay should normally be deënergized, its energization occurring when the test contact of a cord is touched to a test terminal of a busy line, the energization of the relay resulting from the potential upon such test terminal being used to create the busy click in the operator's receiver, it is apparent that as long as the said relay continues energized by such accidental crossing, all lines, whether busy or idle, will appear idle to the operator who tests them. As I consider the first mentioned arrangement for the test relay a preferable one, the present invention is directed to avoiding the difficulties heretofore pointed out and to certain minor improvements of circuit arrangement which will more particularly appear in the description and claims.

Referring to Fig. 1, I have illustrated two subscribers' lines and a single operator's cord circuit organized in accordance with my invention. Referring first to the connecting cord, I show at 14 an answering plug comprising the usual tip and sleeve contacts, and at 34 a connecting plug of a similar character, the tip contacts of the two plugs being connected by a tip cord conductor having a condenser 20 connected at a point intermediate of the connections of the tip supervisory relays 15 and 22, respectively, while the sleeve contacts of the two plugs are connected by a sleeve talking conductor having a condenser 21 interposed intermediate of the connections of sleeves of the supervisory relays 16 and 23, respectively, all in the well-known manner. The apparatus being shown in its normal condition, it is apparent that the calling tip supervisory relay 22 is normally connected over the tip cord strand with the test contact of plug 34, while the common test relay 29 is normally connected through contact 26 with the said test contact over a parallel circuit, the two relays having their windings connected with the grounded side of battery B. The calling sleeve supervisory relay 23 is permanently connected to the sleeve contact of the calling plug 34. It is thus apparent that should the tip and sleeve contacts of the calling plug 34 be connected together either at the plug or by crossing of the cord strands at any point to the right of condensers 20, 21, the relays 22 and 23 would be simultaneously energized and the test relay 29 disconnected from the tip contact of the particular cord circuit whose tip and sleeve plug contacts are thus connected together. Such crossing, therefore, will not result in a locked condition of the test relay 29, but it will be cut off from the disabled cord circuit and still be available for testing purposes to the other cords at the position. In order that notification may be given of such disabled condition of the cord, I have provided a special connection for the calling supervisory lamp 27 in order to render it available not only as a supervisory signal but as an alarm signal to notify the operator of the disabling of the cord with which it is connected. When used for supervisory purposes, the signal 27 has the contact in its circuit at 25 closed by the relay 23 when plug 34 is connected with a called-for line, the relay 23 being then energized over a local circuit including the cut-off relay, in the usual manner. The tip relay 22, when connection is made with a called line and before the called subscriber responds, will allow the signal 27 to be displayed, since the armature of the said relay 22 will be engaging its back contact which is connected to the grounded side of the battery B. The response of the called subscriber will, of course, energize the relay 22 by establishing a conductive bridge of the line limbs at the sub-station, in the usual manner, and the consequent attraction of its armature will open the circuit of the supervisory signal 27, since at this time the answering plug 14 will have been inserted within a spring jack of the calling subscriber and the sleeve answering supervisory relay 16 will have operated in series with the cut-off relay of the calling line, and, by its armature 18, have disconnected the front contact of the armature of relay 22 from its normal ground. However, because of the provision of the armature 18 which normally grounds the front contact of relay 22, it is apparent that should the relays 22 and 23 be energized by a short circuit of the cord strands before referred to, the supervisory signal 27 will be displayed by current from battery B through said signal, attracted armature 25, attracted armature of relay 22, and through normal contact of armature 18, to ground. This abnormal display of the said signal 27 while the plugs 14 and 34 are in their plug seats, will serve to advise the operator that the cord in question is out of service and she will then without delay advise the proper department of the fact. I also provide an additional common signal 28 having branches leading to the armatures 24 of each supervisory relay 23 of the position and through armature 18, to ground, said relay 28 serving solely as a signal to indicate trouble at an operator's position. This signal may, obviously, be located at the switchboard position or it may be located elsewhere, as, for instance, at a desk in the maintenance department, to notify by its display, that cord trouble exists at the particular operator's position which it represents.

The line circuit of line A in Fig. 1, is provided with the line relay 10, whose winding, which may be of high resistance, has a tap from an intermediate point to the armature 9, to the end that when the relay has been energized by current through its entire winding, this being effected by the removal of the receiver from the hook lever of the substation, in the usual manner, the attracted armature 9 will serve to short circuit the greater part of the line relay's winding, a circuit of relatively low resistance from battery B being then established to the line limb of subscriber A through the righthand portion of the winding of the relay 10 and the attracted armature 9. This arrangement is used desirably where the subscribers' lines are of very considerable resistance, as a high wound relay is more reliable where but relatively slight current flow can be secured, as will be the case with such lines. By making the line relay 10 of initial high resistance, it will be operated over a subscriber's line of high resistance, and in the case of an accidental ground, the said relay, by short circuiting the greater portion of the test winding, will allow sufficient current to pass through the heat coil 7 to blow the same and thus save the relay from destruction.

Assuming subscriber A desires his line to be connected with subscriber B, the removal of his receiver from hook lever 1 allows current to flow from battery B through line relay 10, normal contact 5, heat coil 7, transmitter and impedance coil at the sub-station, returning through heat coil 6, armature 4, to ground, whereupon relay 10 attracts its armatures, armature 9 operating as before indicated, while armature 11 closes circuit through line lamp 12 displaying the same to attract the operator's attention, while armature 8 closes circuit through windings 2, 3 of the cut-off relay, but is not effective to operate said relay, its winding being differentially arranged when serially connected with battery. The signal being displayed, the operator inserts plug 14 within answering jack 13, current then flowing from battery B through relay 16, the sleeve plug and jack contact, and through winding 3 of the cut-off relay, to ground, causing a preponderating flow of current therethrough and the attraction of the armatures 4, 5, the latter connecting the sleeve line limb to the sleeve jack contact, whereupon current will pass, branching at alternate contact 5, through the line limbs and hook lever 1 at the sub-station, returning through the tip plug and jack contact and relay 15, to ground, the two relays 15 and 16 being now operated, the supervisory signal 19 remaining inert on account of the attraction of the armature of relay 15. The operator having actuated her listening keys 31, 31 to connect her telephone set in circuit with the calling line, ascertains the number of the called subscriber and touches the tip contact of plug 34 to the sleeve contact of one of the multiple jacks 13, 13′ of the called line, assumed to be B, in order to determine its busy or idle condition, this testing being done while levers 31, 31 are actuated and the shunt of relay 22 removed from test relay 29. In case a line be idle, the sleeve contacts of its spring jacks will be connected to ground through winding 3 of its cut-off relay and will have a potential equal to that of ground. The test relay 29 being also grounded, no current flow therethrough will result and the relay will not attract its armature to close circuit through the operator's induction coil as shown at 30 to give her the customary click. She will, therefore, know the called line is idle, and insert the calling plug 34 within the tested spring jack 13, closing circuit from battery B through relay 23, sleeve plug and jack contact, winding 3 of the cut-off relay of the called line, to ground, thus operating relay 23 and the said cut-off relay, the latter attracting its armatures to disconnect ground and line relay 10 from the limbs of the called line and to connect the sleeve line limb to the sleeve jack contact. Armature 26 of relay 23 is actuated, disconnecting the common test relay 29 and closing a branch path for voice currents about the upper lever 31 of the operator's listening key, in order that she may at will be able to converse with the called-for subscriber, while armature 25 closes a contact in the circuit of calling supervisory lamp 27 which will now be displayed until the called subscriber answers by current through said attracted armature 25, the normal contact of the armature of relay 22, to ground. The operator now rings the called subscriber by depressing levers 32, 32 in the usual manner, and when the called subscriber responds, the relay 22 will be operated by current from the ground over the tip plug and jack contact and the limbs of the line of subscriber B, returning through relay 23 to battery, and the signal lamp 27 will, during conversation, not be displayed, since relay 16 has armature 18 attracted.

In case a called-for line were busy, either because the called subscriber had removed his receiver and his line relay 10 had attracted its armature 8, thus connecting the active side of battery B with the sleeve contact of his multiple jacks 13, 13¹ or because a plug of another cord circuit had already been connected with a spring jack of the line, in which case battery B will be connected to the sleeve contacts of the spring jacks through relay 23 of such other cord circuit, the application of the testing contact of plug 34 to a sleeve contact at the called line would have found a potential other than earth upon said sleeve contact, which potential, developing into a current, would circulate through normal contact 32, normal contact 26, test relay 29, to ground. Thus each time the operator touched the sleeve of the testing spring jack, test relay 29 would be energized, and by closing the circuit from the primary of the operator's induction coil and the associated impedance coil, will produce a click in her head telephone, notifying her that the called-for line was busy, in which case she would so notify the calling subscriber, and upon her restoring the plugs 14, 34, the apparatus would be at normal.

I claim as my invention:

1. A telephone system including a connection device provided with a pair of terminal contacts, a testing device connected with one of said contacts, means whereby the interconnection of said contacts will automatically disconnect said device, and a signal automatically operable to indicate such disconnection.

2. A telephone system including a connection device provided with a pair of terminal contacts, a testing device connected with one of said contacts, a relay connected with one of said contacts, an armature switch thereof included in circuit with said testing device, a source of current having one pole normally connected to one of said contacts through said relay, the opposite pole of said source being normally connected with the other of said contacts, whereby the interconnection of said contacts will operate said relay to disconnect said testing device, and a signal automatically operable to indicate such disconnection.

3. In a telephone system, the combination with a plurality of connecting means each including a pair of terminal contacts, a common testing device normally connected with a terminal contact of each of said means, mechanism whereby the interconnection of any pair of terminal contacts will automatically disconnect said testing device from the respective connecting means, and signaling means automatically operable to indicate such disconnection.

4. In a telephone system, the combination with lines having terminals at an exchange, an operator's connection terminal having a test contact for application to said terminals to determine the idle or busy conditions of said lines, an operator's test device normally in circuit with said test contact, an additional contact included in said connection terminal, means automatically effective on the interconnection of said contacts to disconnect said device from said test contact, and a signal operable to indicate such disconnection.

5. In a telephone system, the combination with lines having terminals at an exchange, an operator's connection terminal having a test contact for application to said terminals to determine the idle or busy conditions of said lines, an operator's test device normally in circuit with said test contact, an additional contact included in said connection terminal, a relay connected with one of said contacts, an armature switch thereof included in circuit with said test device, means effective on the interconnection of said contacts to operate said relay, whereby said armature switch disconnects said test device, and a signal operable to indicate such disconnection.

6. In a telephone system, the combination with a number of operators' link circuits, of a common test relay normally connected with said circuits, means for disconnecting said relay from any circuit, a signal automatically operable to indicate premature disconnection of said relay from a circuit and a common signal operable to indicate such disconnection.

7. In a telephone system, the combination with a number of operators' link circuits, of test contacts therefor, a test relay normally connected with said contacts, and a signal common to said link-circuits operated on the disconnection of said relay from any link circuit which is not in use.

8. In a telephone system, the combination with a number of operators' link circuits, of test contacts therefor, a test relay normally connected with said contacts, a signal common to said circuits, and means for displaying said signal when said relay is disconnected from a circuit which is idle.

9. A telephone system including subscribers' lines, a plurality of operators' circuits for interconnecting said lines, a calling terminal for each said circuit including a pair of terminal contacts, an answering terminal for each said circuit, a common test relay for said circuits having branch connections, one normally extending to a contact of each calling terminal, means for disconnecting said relay from the contact of a terminal when its two contacts are connected together, and a supervisory signal operative when the contacts are so connected to indicate such disconnection.

10. A telephone system including subscribers' lines, a plurality of operators' circuits for interconnecting said lines, a calling terminal for each said circuit including a pair of terminal contacts, an answering terminal for each said circuit, a common test relay for said circuits having branch connections, one normally extending to a contact of each calling terminal, means for disconnecting said relay from the contact of a terminal when its two contacts are connected together, a supervisory signal operative when its contacts are so connected to indicate such connection, and an electro-magnet associated with an answering end of each circuit for operation to alter control of said supervisory signal, whereby on connection of the calling terminal of a link circuit whose electro-magnet is operated with a telephone line, said signal will be operative only when the contacts of its circuit are disconnected.

11. A telephone system including subscribers' lines, a plurality of operators' circuits for interconnecting said lines, a calling terminal for each said circuit including a pair of terminal contacts, an answering terminal for each said circuit, a common test relay for said circuits having branch connections, one normally extending to a contact of each calling terminal, means for disconnecting said relay from the contact of a terminal when its two contacts are connected together, a supervisory signal associated with said calling terminal, and electro-magnetic means operable on connection of said contact pair to display said signal.

12. A telephone system including subscribers' lines, a plurality of operators' circuits for interconnecting said lines, a calling terminal for each said circuit including a pair of terminal contacts, an answering terminal for each said circuit, a common test relay for said circuits having branch connections, one normally extending to a contact of each calling terminal, means for disconnecting said relay from the contact of a terminal when its two contacts are connected together, a supervisory signal associated with said calling terminal, electro-magnetic means operable on connection of said contact pair to display said signal, and means controlled by the connection of said answering terminal with a calling line serving to prevent the display of said signal on connection of said contact pair.

13. A telephone system including telephone lines, an operator's link circuit for interconnecting said lines, provided with an answering terminal and a calling terminal, a pair of contacts included in said calling terminal, a test relay connected to one of said contacts, means for disconnecting said relay from said contact, a signal operable to indicate such disconnection, and means controlled by the connection of said answering terminal with a telephone line serving to prevent the operation of said signal as described.

14. A telephone system including telephone lines, an operator's link circuit for inter connecting said lines, provided with an answering terminal and a calling terminal, a pair of contacts included in said calling terminal, a test relay connected to one of said contacts, an electro-magnet operable on inter connection of said contacts to disconnect said test relay, a signal operable to indicate such disconnection, and means controlled by the connection of said answering terminal with a telephone line serving to prevent the operation of said signal as described.

15. In a telephone system, the combination with an operator's cord circuit having a normally continuous cord strand, of a test relay normally connected thereto, means for rendering said strand discontinuous when testing, apparatus for disconnecting said test relay from said strand, mechanism for automatically actuating said apparatus effective when said cord circuit is disabled, and a signal thereon displayed to indicate such disconnection.

16. In a telephone system, the combination with a number of operators' link-circuits, of a test relay common to said circuits, means for automatically disconnecting said relay from any circuit which is disabled, a common signal for indicating said disconnection, a pair of relays connected to the opposite ends of a link-circuit and a contact of each said relay in the controlling circuit of said signal.

17. In a telephone system, the combination with a cord-circuit, of a test relay for operation by current over said circuit, a pair of relays bridged across said cord-circuit at its calling end, a third relay connected to the answering end of said cord-circuit, a signal adapted for display when both said first-mentioned relays are energized, said third relay being deënergized to indicate disconnection of said test relay, and means controlled by the energization of said third relay to prevent the display of said signal when said two relays are energized.

18. In a telephone system, the combination with a cord-circuit, of a signal therefor, a pair of relays bridged to opposite sides of said cord-circuit, means whereby the operation of both said relays, when said cord-circuit is not in use, will display said signal, and a third relay adapted for energization when said cord-circuit is first placed in use to alter the connections of said signal.

19. In a telephone system, the combination with a cord-circuit, of a signal therefor, a pair of relays connected with the opposite sides of said cord-circuit, means whereby the energization of both said relays will display said signal when said cord-circuit is not in use, a third relay for said cord-circuit, and means whereby the operation of said third relay alters the control of said signal, said signal being only displayed when said third relay is operated upon deënergization of one of said first-mentioned relays and energization of the other.

In witness whereof, I hereunto subscribe my name this 2nd day of Dec., 1907.

HARRY G. WEBSTER.

Witnesses:
J. G. KELLOGG,
G. E. MUELLER.